United States Patent [19]

Markusch et al.

[11] Patent Number: 4,501,852

[45] Date of Patent: Feb. 26, 1985

[54] STABLE, AQUEOUS DISPERSIONS OF POLYURETHANE-UREAS

[75] Inventors: Peter H. Markusch, McMurray; James W. Rosthauser, Imperial; Michael C. Beatty, Pittsburgh, all of Pa.

[73] Assignee: Mobay Chemical Corporation, Pittsburgh, Pa.

[21] Appl. No.: 505,600

[22] Filed: Jun. 20, 1983

[51] Int. Cl.³ .............................................. C08L 75/12
[52] U.S. Cl. ................................... 524/591; 524/839; 524/840; 524/762
[58] Field of Search ........................ 524/591, 839, 840

[56] References Cited

U.S. PATENT DOCUMENTS

| | | | |
|---|---|---|---|
| 3,479,310 | 11/1969 | Dieterich | 260/29.2 |
| 3,870,684 | 3/1975 | Witt et al. | 260/75 NH |
| 4,016,122 | 4/1977 | Matsuda | 524/591 |
| 4,066,591 | 1/1978 | Scrivens et al. | 260/29.2 |
| 4,092,286 | 5/1978 | Noll et al. | 260/29.2 |
| 4,108,814 | 8/1978 | Rieff et al. | 260/29.2 |
| 4,203,883 | 5/1980 | Hangauer, Jr. | 260/29.2 |
| 4,237,264 | 12/1980 | Noll et al. | 528/67 |
| 4,238,378 | 12/1980 | Markusch et al. | 260/29.2 |
| 4,387,181 | 6/1983 | Brown | 524/840 |
| 4,408,008 | 10/1983 | Markusch | 524/591 |
| 4,452,834 | 6/1984 | Nachtkamp | 524/591 |
| 4,460,738 | 7/1984 | Frentzel | 524/591 |

*Primary Examiner*—C. Warren Ivy
*Attorney, Agent, or Firm*—Gene Harsh; Joseph C. Gil; Thomas W. Roy

[57] ABSTRACT

The present invention relates to a stable, aqueous dispersion of polyurethane-ureas wherein said polyurethane-ureas contain (i) about 10 to 120 milliequivalents per 100 grams of polyurethane-urea of chemically incorporated anionic groups, and (ii) up to about 10% by weight, based on the weight of the polyurethane-urea, of lateral and/or terminal hydrophilic chains containing ethylene oxide units, wherein the counterions of the anionic groups are a mixture of volatile and non-volatile cations in an equivalent ratio of about 1:4 to 4:1.

The present invention is also directed to the coatings and films prepared from these dispersions.

17 Claims, No Drawings

STABLE, AQUEOUS DISPERSIONS OF POLYURETHANE-UREAS

BACKGROUND OF THE INVENTION

1. Field of the Invention

The present invention is directed to stable, aqueous dispersions of polyurethane-ureas containing chemically incorporated anionic groups which are neutralized with a mixture of volatile and nonvolatile cations.

2. Description of the Prior Art

The production of linear or cross-linked, aqueous, polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684 and 4,203,883 as well U.S. Pat. No. 4,408,008, issued Oct. 4, 1983, which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

However, one property of coatings prepared from aqueous polyurethane-urea dispersions which need to be improved in order to match the performance of coatings prepared from solvent-based polyurethane lacquers is the hydrolytic stability. This property is adversely affected by the hydrophilic materials necessary for ensuring the dispersibility of the polyurethane-ureas in an aqueous medium.

Accordingly, it is an object of the present invention to provide aqueous polyurethane-urea dispersions which may be used to prepare coatings having improved hydrolytic stability.

It is an additional object of the present invention to provide aqueous polyurethane-urea dispersions which may be used to prepare coatings having excellent chemical resistance, abrasion resistance, toughness, tensile strength, resistance to water swell, elasticity and durability.

Surprisingly, it has been found that these objectives may be achieved according to the present invention as hereinafter described.

SUMMARY OF THE INVENTION

The present invention relates to a stable, aqueous dispersion of polyurethane-ureas wherein said polyurethane-ureas contain (i) about 10 to 120 milliequivalents per 100 grams of polyurethane-urea of chemically incorporated anionic groups, and (ii) up to about 10% by weight, based on the weight of the polyurethane-urea, of lateral and/or terminal hydrophilic chains containing ethylene oxide units, wherein the counterions of the anionic groups are a mixture of volatile and non-volatile cations in an equivalent ratio of about 1:4 to 4:1.

The present invention is also directed to the coatings and films prepared from these dispersions.

DETAILED DESCRIPTION OF THE INVENTION

The aqueous polyurethane-urea dispersions are preferably prepared by a two-stage process wherein an isocyanate-terminated prepolymer is formed in the first stage by reacting an excess of a polyisocyanate with an isocyanate-reactive component as discussed in more detail hereinafter. The isocyanate-terminated prepolymer is then chain extended in a second stage to form the polyurethane-urea either before, during or after being mixed with an aqueous medium.

Examples of suitable polyisocyanates to be used in preparing the isocyanate-terminated prepolymers in accordance with the present invention are organic diisocyanates represented by the general formula

in which R represents an organic group obtainable by removal of the isocyanate groups from an organic diisocyanate having a molecular weight of from about 112 to 1,000, and preferably from about 140 to 400. Diisocyanates preferred for the process according to the invention are those represented by the general formula indicated above in which R represents a divalent aliphatic hydrocarbon group having from 4 to 18 carbon atoms, a divalent cycloaliphatic hydrocarbon group having from 5 to 15 carbon atoms, or an araliphatic hydrocarbon group having from 7 to 15 carbon atoms. Examples of the organic diisocyanates which are particularly suitable for the process include tetramethylene diisocyanate: 1,6-hexamethylene diisocyanate; dodecamethylene diisocyanate: cyclohexane-1,3-and-1,4-diisocyanate: 1-isocyanato-3-isocyanatomethyl-3,5,5-trimethyl-cyclohexane (isophorone diisocyanate or IPDI): bis-(4-isocyanatocyclohexyl)-methane; 1,3- and 1,4-bis-(isocyanatomethyl)cyclohexane: and bis-(4-isocyanato-3-methyl-cyclohexyl)-methane. Mixtures of diisocyanates can, of course, be used. Preferred diisocyanates are 1,6-hexamethylene diisocyanate, isophorone diisocyanate and bis-(4-isocyanatocyclohexyl)methane with bis-(4-isocyanatocyclohexyl)-methane being especially preferred.

In addition to the organic diisocyanates containing aliphatically- and/or cycloaliphatically-bound isocyanate groups previously set forth, it is also possible in accordance with the present invention to use aromatic diisocyanates of the above formula wherein R represents a difunctional aromatic hydrocarbon radical having from 6 to 15 carbon atoms. Suitable aromatic diisocyanates include 2,4-diisocyanato toluene, 2,6-diisocyanato toluene, mixtures of these isomers, 4,4-diisocyanato diphenyl methane and its isomeric mixtures with 2,4'- and optionally 2,2'-diisocyanato diphenyl methane, and 1,5-diisocyanato naphthalene.

When aromatic diisocyanates are exclusively used to prepare prepolymers, the terminal isocyanate groups of the prepolymer are aromatically-bound, and due to the higher rate of reactivity for aromatically-bound isocyanate groups when compared to aliphatically-or cycloaliphatically-bound isocyanate groups, some of the known processes to be discussed hereinafter for converting the prepolymers into polyurethane-ureas in the second stage of the two-stage process cannot be conducted in large scale applications with prepolymers having aromatically-bound, terminal isocyanate groups, especially when the second step is conducted in the presence of an aqueous medium. However, mixtures of aromatic and nonaromatic diisocyanates may be used in preparing prepolymers which are capable of being used in these processes.

The amount of the aromatic diisocyanate which can be used in preparing the prepolymers according to these processes may be determined with reference to the fact that the preferred prepolymers predominantly contain aliphatically- and/or cycloaliphatically-bound, terminal isocyanate groups. In other words both of the isocyanate groups of the aromatic diisocyanates should be substantially incorporated into the backbone of the prepolymers. Accordingly, with this fact in mind, the maximum amount of aromatic diisocyanate which can be incorporated into the prepolymers may be readily determined from the ratio of isocyanate groups to isocyanate-reactive groups used in preparing the prepolymers.

One method of preparing the prepolymers containing internal aromatic diisocyanates is to form an OH-terminated prepolymer which is subsequently capped with an organic diisocyanate containing aliphatically- and/or cycloaliphatically-bound isocyanate groups. However, it is preferred to prepare the prepolymers containing internal, aromatic diisocyanates in one step by adding the isocyanate-reactive component to a mixture of the aromatic diisocyanate and the organic diisocyanate containing aliphatically-and/or cycloaliphatically-bound isocyanate groups. Due to the higher reactivity of the aromatic diisocyanates, they will generally react preferentially and be substantially incorporated into the backbone of the prepolymer.

The organic compounds containing at least two isocyanate-reactive groups which are reacted with the previously described organic diisocyanates to prepare the isocyanate-terminated prepolymers can be divided into two groups, i.e., high molecular weight compounds with molecular weights from about 300 to 6,000, preferably from about 300 to 3,000, and low molecular weight compounds with molecular weights below about 300. Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of dihydric alcohols and dibasic carboxylic acids. Instead of free dicarboxylic acids, the corresponding dicarboxylic acid anhydrides or dicarboxylic acid esters of lower alcohols or mixtures thereof may be used for preparing the polyesters. The dicarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic anhydride; tetrahydrophthalic anhydride; hexahydrophthalic anhydride; tetrachlorophthalic anhydride; endomethylene tetrahydrophthalic anhydride; glutaric anhydride; maleic acid; maleic anhydride; fumaric acid; dimeric fatty acids such as oleic acid, dimethyl terephthalate and bis-glycolterephthalate. Suitable dihydric alcohols include, e.g. ethylene glycol; propylene glycol-(1,2) and -(1,3); butylene glycol-(1,4) and -(1,3); hexanediol-(1,6); octanediol(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol. The polyesters may also contain a proportion of carboxyl end groups. Polyesters of lactones, e.g. $\epsilon$-caprolactone or hydroxycarboxylic acids, e.g. $\omega$-hydroxycaproic acid, may also be used.

Polycarbonates containing hydroxy groups include those known per se such as the products obtained from the reaction of diols such as propanediol(1,3), butanediol-(1,4) and/or hexanediol-(1,6), diethylene glycol, triethyleneglycol or tetraethylene glycol with diarylcarbonates, e.g. diphenylcarbonate, or phosgene.

Suitable polyether polyols are obtained in known manner by the reaction of the starting compounds which contain reactive hydrogen atoms with alkylene oxides with as ethylene oxide; propylene oxide; butylene oxide; styrene oxide; tetrahydrofuran or epichlorohydrin or with mixtures of these alkylene oxides. It is preferred that the polyethers do not contain more than about 10% by weight of ethylene oxide units. Most preferably, polyethers obtained without the addition of ethylene oxide are used.

Suitable starting compounds containing reactive hydrogen atoms include, e.g. water and the dihydric alcohols set forth for preparing the polyester polyols.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamides are, for example, the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The compositions may also contain a low molecular weight isocyanate-reactive component having an average molecular weight of up to about 300. The low molecular weight compounds which may optionally be used in combination with the high molecular weight isocyanate-reactive compounds for the preparation of the isocyanate-terminated prepolymers include, for example, the dihydric alcohols which have been described for the preparation of the polyester polyols; diamines such as diaminoethane, 1,6-diaminohexane, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, amino acid hydrazides, hydrazides of semicarbazidocarboxylic acids, bis-hydrazides and bis-semicarbazides; and the like. The dihydric alcohols are the preferred low molecular weight isocyanate-reactive component for preparing the isocyanate-terminated prepolymers.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting components below about 2.1.

In order to enable the polyurethane-urea to be stably dispersed in an aqueous medium, anionic or potential anionic groups and, optionally, lateral or terminal, hydrophilic ethylene oxide units are chemically incorporated into the polyurethane-urea. The anionic or potential anionic groups are incorporated in an amount sufficient to provide an anionic group content of about 10 to 120 milliequivalents, preferably about 10 to 80 milliequivalents, more preferably about 10 to 60 milliequivalents and most preferably about 10 to 30 milliequivalents per 100 g of polyurethane-urea. The content of hydrophilic ethylene oxide units may be up to about 10%, preferably up to about 8%, more preferably about 1 to 6% and most preferably about 2 to 6%, by weight, based on the weight of the polyurethane-urea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The anionic or potential anionic groups may be chemically incorporated into the isocyanate-terminated prepolymer or may be chemically incorporated through the chain extender which is used to form the polyurethane-urea from the prepolymer. Suitable compounds for incorporating these groups include (i) monoisocyanates or diisocyanates which contain anionic or potential anionic groups and (ii) compounds which are monofunctional or difunctional in the isocyanate-polyaddition reaction and contain anionic or potential anionic groups.

Preferred anionic groups are -COO$^{\ominus}$ and -SO$_3^{\ominus}$. The anionic groups are formed by neutralizing the corresponding potential ionic groups either prior to, during or after formation of the polyurethane-urea. When the potential anionic groups are neutralized prior to their incorporation into the polyurethane-urea, the anionic groups are incorporated directly. When neutralization is performed subsequent to forming the polyurethane-urea, potential ionic groups are incorporated.

Suitable compounds for incorporating the previously discussed carboxylate or sulfonate groups are described in U.S. Pat. Nos. 3,479,310, 4,108,814 and 4,303,774, the disclosures of which are herein incorporated by reference. The preferred sulfonate groups for incorporation into the isocyanate-terminated prepolymer are the diol sulfonic acids or diol sulfonates disclosed in U.S. Pat. No. 4,108,814.

The neutralizing agents for converting the potential anionic groups to anionic groups are more fully discussed hereinafter. Within the context of this invention, the term "neutralizing agents" is meant to embrace all types of agents which are useful for converting potential anionic groups to anionic groups.

The preferred carboxylate groups for incorporation into the isocyanate-terminated prepolymer are derived from hydroxy-carboxylic acids of the general formula:

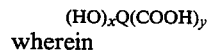

wherein

Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the abovementioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula:

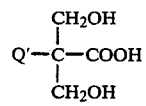

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the isocyanate-terminated prepolymer to the polyurethane-urea in the second stage of the two-stage process, it is preferred to use amino functional compounds containing anionic or potential anionic groups such as the diamino carboxylic acids or carboxylates disclosed in U.S. Pat. No. 3,539,483, salts of isethionic acid or 2,6-diamino-hexanic acid or more preferably diamino sulfonates of the formula

wherein

A and B represent aliphatic hydrocarbon radicals containing 2 to 6 carbon atoms, preferably ethylene groups.

The type of anion and whether it is incorporated into the polyurethane-urea via the prepolymer or the chain extender is not critical since the present invention is essentially directed to the mixture of volatile and non-volatile cations used to convert the potential anionic groups to anionic groups. Accordingly, the anionic groups may be exclusively sulfonate groups, and preferably either exclusively carboxylate groups or mixtures of carboxylate groups and sulfonate groups. Further, the anionic groups may exclusively be incorporated via the prepolymer or via the chain extender or a portion of the anionic groups may be introduced according to each alternative. However, it is preferred to introduce the anionic group via the prepolymer since this allows a wider range of process variations in preparing the polyurethane-urea dispersion.

Suitable compounds for incorporating the lateral or terminal, hydrophilic ethylene oxide units may be either monofunctional or difunctional in the context of the isocyanate-polyaddition reaction and include (i) diisocyanates which contain lateral, hydrophilic ethylene oxide units, (ii) compounds which are difunctional in the isocyanate-polyaddition reaction and contain lateral, hydrophilic ethylene oxide units, (iii) monoisocyanates which contain terminal, hydrophilic ethylene oxide units, (iv) compounds which are monofunctional in the isocyanate-polyaddition reaction and contain terminal, hydrophilic ethylene oxide units, and (v) mixtures thereof.

The preferred difunctional hydrophilic components having lateral hydrophilic chains containing ethylene oxide units include compounds corresponding to the following general formula:

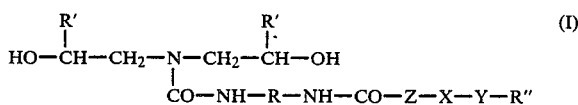

and/or compounds corresponding to the following general formula:

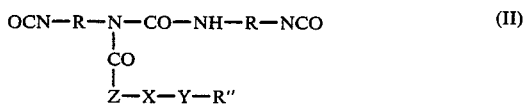

Preferred difunctional hydrophilic components are those corresponding to general formula (I) above.

In general formulae (I) and (II) above, R represents a difunctional radical of the type obtained by removing the isocyanate groups from a diisocyanate corresponding to the general formula:

of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal hydroxyl group from a polyalkylene oxide chain having from about 5 to 90 chain members, preferably from about 20 to 70 chain members, of which at least about 40%, preferably at least about 65%, comprises ethylene oxide units and the remainder comprises other alkylene oxides such as propylene oxide, butylene oxide or styrene oxide units, preferably propylene oxide units;

Y represents oxygen or —NR'"—wherein R'" has the same definition as R"; and

Z represents a radical which corresponds to Y, but may additionally represent —NH—.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight based on polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred hydrophilic components for incorporating lateral or terminal hydrophilic chains containing ethylene oxide units include compounds corresponding to the following general formula:

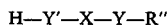

and/or compounds corresponding to the following general formula:

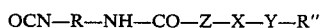

wherein

X, Y, Z, R and R" are as defined above; and Y' corresponds in its meaning to Y, but may additionally represent —NH—.

Monofunctional polyethers are preferably used, but preferably only in molar quantities of ≦10%, based on the polyisocyanate used, to guarantee the required high molecular weight structure of the polyurethane-urea. In cases where relatively large molar quantities of monofunctional alkylene oxide polyethers are used, it is advantageous also to use trifunctional compounds containing isocyanate-reactive hydrogen atoms, although the average functionality of the polymer starting components should preferably not exceed about 2.1 in order to obtain substantially linear prepolymers.

The monofunctional hydrophilic components are produced in accordance with the processes described in U.S. Pat. Nos. 3,905,929 and 3,920,598 by alkoxylating of a monofunctional starter, such as n-butanol, using ethylene oxide and optionally another alkylene oxide, for example propylene oxide. The resultant product may be optionally further modified (although this is less preferred) by reaction with excess quantities of diisocyanates or by reaction with ammonia to form the corresponding primary amino-polyethers.

The isocyanate-terminated prepolymers of the present invention are prepared by reacting the polyisocyanate component with the high molecular weight organic component containing at least 2 isocyanate-reactive groups and the following optional components, i.e. the low molecular weight organic component containing at least 2 isocyanate-reactive groups, the component containing at least one anionic group or at least one potential anionic group and the component containing the hydrophilic ethylene oxide units. The potential anionic groups are groups which may be converted to anionic groups by treatment with neutralizing agents. The ratio of isocyanate groups to isocyanate-reactive groups is maintained between about 1.1 to 3, preferably about 1.2 to 2 and most preferably about 1.3 to 1.5 on an equivalent basis. The above components may be reacted simultaneously or sequentially to produce the isocyanate-terminated prepolymer. Simultaneous reaction will lead to the production of random copolymers, whereas a sequential-type reaction will lead to the production of block copolymers. The order of addition of the compounds containing isocyanate-reactive hydrogen(s) in the sequential-type reaction process is not critical; however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 8%, preferably about 1 to 5% by weight, based on the weight of prepolymer solids. It is possible to conduct the prepolymer reaction in the presence of catalysts known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as to permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycolether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons, and the like, and mixtures thereof. The amount of solvent employed, if any, can vary widely. The amount of solvent employed should be sufficient to provide a prepolymer solution having a sufficiently low viscosity to enhance the formation of the polyurethane-urea dispersion of this invention; however, the solutions may be successfully employed in forming the dispersions even though the viscosity of the solution is relatively high at the temperature of dispersion. Such viscosities may be as low as 100 centipoise or above 10,000 centipoise, and only mild agitation need be employed to form the dispersion, even in the absence of an external emulsifying agent. Often about 0.01 to 10 parts by weight of solvent, preferably about 0.02 to 2 parts by weight of solvent, per part by weight of the prepolymer can be used. However, the presence of a solvent for the prepolymer or the polyurethane-urea is not necessary to provide a stable, aqueous dispersion. Often, when solvent is employed during the preparation of the isocyanate-terminated prepolymer and/or the polyurethane-urea it is desirable to remove at least a portion of the solvent from the aqueous dispersion. Advantageously, the solvent to be removed from the dispersion has a lower boiling point than water and thus can be removed from the dispersion by, for example, distillation. The removal of the low boiling solvent is desirably conducted under conditions which are not deleterious to the polyurethane-urea such as by vacuum distillation or thin film evaporation. A solvent having a higher boiling point than water such as dimethyl formamide, N-methyl-2-pyrrolidinone, and the like may be employed, in which case, the higher boiling solvent is generally retained in the polyurethane-urea aqueous dispersion polymer to enhance the coalescence of the polyurethane-urea particles during film formation.

In order to convert the potential anionic groups to anionic groups either before, during or after their incorporation into the polyurethane-ureas, a mixture of volatile and nonvolatile cations is used to form the counterions of the anionic groups. Volatile cations are those wherein at least about 90% of the cations volatilize under the conditions used to cure films formed from the polyurethane-urea dispersions, preferably at least about 90% of the cations volatilize when films formed from the polyurethane-urea dispersions are cured under ambient conditions. Nonvolatile cations are those wherein at least about 90% of the cations do not volatilize under the conditions used to cure films formed from the polyurethane-urea dispersions, preferably at least about 90% of the cations do not volatilize when films formed from the polyurethane-urea dispersions are cured under ambient conditions. The counterions of the anionic groups should be present at an equivalent ratio between the volatile and nonvolatile cations of about 1:4 to 4:1, preferably about 1:2 to 2:1. As the amount of counterions formed from volatile cations increases, the resistance to water swell of coatings or films prepared from the aqueous polyurethane-urea dispersions is further improved; whereas, as the amount of counterions formed from nonvolatile cations increases, the hydrolytic stability of films or coatings prepared from the aqueous polyurethane-urea dispersions is further improved. Therefore, in accordance with the present invention it is possible to control the properties of the finally produced coatings or films by simply controlling the ratio between the volatile and nonvolatile cations used to form the counterions of the anionic groups.

Suitable volatile cations for neutralizing the potential anionic groups are the primary, secondary or tertiary amines. Of these the trialkyl-substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethylethanol amine, N,N-diethyl-ethanol amine, triethanol amine, N-methyl-diethanol amine, dimethylaminopropanol, 2-methoxyethyldimethyl amine, N-hydroxyethylpiperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with the isocyanate groups of the prepolymers which can cause gelation, the formation of insoluble particles or chain termination.

The more volatile tertiary amines are especially advantageous since the salts formed from these amines are capable of decomposing during film formation under ambient conditions with volatilization of the tertiary amine. Another advantage of these tertiary amines is that they do not take part in the isocyanate-polyaddition reaction. For example, when isocyanate-terminated prepolymers containing potential anionic groups are formed, it would be difficult to neutralize these groups prior to dispersion in water with primary or secondary amines due to the fact that these amines may react with the free isocyanate groups of the prepolymer. In this context, these amines act more like chain terminators or chain extenders than neutralizing agents, and make the subsequent high molecular weight build-up during the aqueous chain extension step more difficult and less predictable. Thus, if primary and secondary amines are used, they should preferably be used as neutralizing agents prior to the formation of the prepolymer, i.e., when the potential anionic groups are converted to anionic groups prior to their incorporation into the prepolymer. However, the tertiary amines are preferred even when neutralization is conducted in this manner.

Suitable nonvolatile cations include monovalent metals, preferably alkali metals, more preferably lithium, sodium and potassium and most preferably sodium. The cations may be used in the form of inorganic or organic salts, preferably salts wherein the anions do not remain in the dispersions such as hydrides, hydroxides, carbonates or bicarbonates.

When the potential anionic groups of the prepolymer are neutralized, they provide hydrophilicity to the prepolymer and better enable it to be stably dispersed in water. The potential or unneutralized anionic groups do not provide this degree of hydrophilicity. Accordingly, a sufficient amount of the potential ionic groups must be neutralized so that when combined with the optional hydrophilic ethylene oxide units, the polyurethane-urea final product will be a stable dispersion. Generally, at least about 75%, preferably at least about 90%, of the potential anionic groups are neutralized to the corresponding anionic groups. Larger amounts of potential ionic groups may remain unneutralized; however, there are no advantages to be gained from large quantities of unneutralized potential anionic groups and their presence could be detrimental by minimizing the improvements in hydrolytic stability which are obtained in accordance with the present invention. When smaller amounts of potential ionic groups are incorporated, it may be necessary to neutralize substantially all of these groups to obtain the desired amount of hydrophilicity. No firm guidelines can be given as to the amount of anionic groups needed, since the dispersibility of the polyurethane-urea depends on many factors including, but not limited to, the amount of hydrophilicity provided by the ethylene oxide units, the desired particle size and the application requirements.

The neutralization steps may be conducted (1) prior to prepolymer formation by treating the component containing the potential ionic groups(s), (2) after prepolymer formation, but prior to dispersing the prepolymer or (3) by adding the neutralizing agent to all or a portion of the dispersing water. The reaction between the neutralizing agent and the potential anionic groups may be conducted between about 20° C. and 150° C., but is normally conducted at temperatures below about 100° C., preferably between about 30° and 80° C. and most preferably between about 50° and 70° C., with agitation of the reaction mixture.

The isocyanate-terminated prepolymers may be converted into aqueous polyurethane-urea dispersions in accordance with the methods known in polyurethane chemistry. It is also possible in accordance with the present invention to mix dispersions prepared by the different methods set forth hereinafter. In addition, it is possible to prepare one dispersion neutralized with volatile cations and a second dispersion, prepared by the same or a different process, neutralized with nonvolatile cations which may subsequently be mixed in order to obtain the improvements in hydrolytic stability disclosed herein.

According to one process for preparing the polyurethane-urea dispersions, the isocyanate-terminated prepolymer is prepared in the melt and subsequently dissolved in a suitable solvent and chain extended to form a polyurethane-urea. The solution of the polyurethane-urea is then mixed with water and the solvent is removed by distillation to produce the aqueous polyurethane-urea dispersion. This process is disclosed in U.S. Pat. No. 3,479,310, herein incorporated by reference, and may be conducted with any of the polyisocyanates set forth as suitable for the preparation of the isocyanate-terminated prepolymers including the aromatic diisocyanates. However, the process is limited to the production of substantially linear polyurethane-ureas since cross-linked polyurethane-ureas may gel when prepared in the organic phase.

Polyurethane-urea dispersions may also be prepared in accordance with U.S. Pat. No. 3,756,992 by converting the terminal isocyanate groups of a hydrophilic prepolymer to acylated amino groups by reaction with urea, ammonia or other suitable compounds. The acylated amino end groups are then converted to methylol end groups by reaction with formaldehyde or related compounds either before, during, or after the addition of water. The methylol end groups are then linked through methylene bridges by heating the dispersions. This process may be conducted with any of the polyisocyanates set forth as suitable for the preparation of isocyanate-terminated prepolymers including the aromatic diisocyanates.

An additional method of forming the aqueous polyurethane-urea dispersions is by conducting the chain extension of the isocyanate-terminated prepolymers in an aqueous medium. In one embodiment hydrophilic, isocyanate-terminated prepolymers are mixed with at least partially blocked, diamine or hydrazine chain extenders in the absence of water and the mixture is then mixed with water which releases the blocking agent to allow chain extension of the prepolymers. Processes of this type are disclosed in German Offenlegungsschrift 2,725,589 or U.S. Application Serial No. 447,575, filed Dec. 7, 1982, and in U.S. Pat. Nos. 4,269,748, 4,192,937 and 4,292,226. Aromatic diisocyanates may also be used to prepare the isocyanate-terminated prepolymers to be used according to these processes; however, prepolymers containing aliphatically- and/or cycloaliphatically-bound, terminal isocyanate groups are preferred.

The preferred method of conducting the chain extension of the isocyanate-terminated prepolymer in an aqueous medium is by dispersing the prepolymer in water and subsequently adding the chain extender. To form the dispersion either water is added to the prepolymer or the prepolymer is added to water. Prepolymers containing aliphatically- and/or cycloaliphatically-bound terminal isocyanate groups are especially preferred when chain extension is conducted in the presence of an aqueous medium. If it is desired to chain extend prepolymers containing aromatically-bound, terminal isocyanate groups by this method, then it is preferable to block the isocyanate groups prior to contact with water as disclosed in U.S. Pat. No. 4,387,181.

As water is added to the prepolymer with agitation, the viscosity of the mixture increases significantly, since initially the organic phase is continuous. As the addition of water is continued, a point is reached where a phase change occurs and the aqueous phase becomes continuous and the viscosity decreases. The remaining portion of the water is then added. If the neutralizing agent is in the dispersing water, then it is important that sufficient anionic groups be present to produce a stable dispersion at the point of phase change when combined with the hydrophilic effect of the ethylene oxide units. This problem may be obviated by adding all of the neutralizing agent with a portion of the dispersing water which is insufficient to cause the phase change, followed by the addition of the remaining water. This problem may also be overcome by incorporating excess hydrophilic ethylene oxide units and/or potential anionic groups into the prepolymer, or by using an excess of the neutralizing agent. These latter methods, are less preferred since they may minimize the improvements in hydrolytic stability which are obtained in accordance with the present invention.

When the prepolymer is added to the water significant increases in viscosity do not occur. In addition, if alternative 3 is used for neutralization, all of the neutralization agent is present in the water prior to the addition of the prepolymer. In addition, the problems discussed in the preceding paragraph are not encountered when the neutralizing agent is present in the dispersing water since all of the water is initially present.

The prepolymer is usually added in increments to the water or water-neutralizing agent mixture. The aqueous mixture is preferably agitated during the addition of the prepolymer to assist in forming the dispersion. Any low boiling solvent present during prepolymer formation may be removed prior to dispersing the prepolymer; however, it is preferred to remove the solvent after the dispersion is formed since the solvent, especially water miscible solvents will facilitate the formation of the dispersion, and also, the subsequent reaction with the amine chain extenders. The presence of solvent is especially preferred when the dispersion is formed by adding water to the prepolymer since it helps to reduce the viscosity peak normally encountered with this process.

After the formation of the dispersed, isocyanate-terminated prepolymer the amine chain extenders should be added before the reaction of the terminal isocyanate groups with water proceeds to any significant extent, normally within about 30 minutes, preferably within about 15 minutes depending on the temperature.

The aqueous polyurethane-urea dispersions of the present invention are formed by reacting the isocyanate-terminated prepolymers with a polyamine or a mixture of polyamines in accordance with the previously described processes. The average functionality of the amine, i.e., the number of amine nitrogens per molecule, should be between about 2 and 6, preferably between about 2 and 4 and most preferably between about 2 and 3. The desired functionalities can be obtained by using mixtures of polyamines. For example, a functionality of 2.5 can be achieved by using equimolar mixtures of diamines and triamines. A functionality of 3.0 can be achieved either by using
 (1) triamines,
 (2) equimolar mixtures of diamines and tetramines,
 (3) mixtures of 1 and 2, or
 (4) any other suitable mixtures.

These other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substituents provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine and 2,4-bis-(4'-aminobenzyl)-anilie. Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, ethylene diamine, diethylene triamine, triethylene tetramine. tetraethylene pentamine and pentaethylene hexamine.

The amount of polyamine chain extender to be used in accordance with the present invention is dependent upon the number of terminal isocyanate groups in the prepolymer. Generally, the ratio of terminal isocyanate groups of the prepolymer to the amino hydrogens of the polyfunctional amine is between about 1.0:0.6 and 1.0:1.1, preferably between about 1.0:0 8 and 1.0:0.98 on an equivalent basis. Lesser amounts of the polyamine will allow for too much undesired reaction of the isocyanate groups with water, while an undue excess may lead to products with undesirably low molecular weights. For the purposes of these ratios a primary amino group is considered to have one amino hydrogen. For example, ethylene diamine has two equivalents of amino hydrogens and diethylene triamine has three equivalents.

The reaction between the isocyanate-terminated prepolymer and the polyamine is generally conducted at temperatures from about 5° to 90° C., preferably from about 20° to 80° C., and most preferably from about 30° to 60° C. The reaction conditions are normally maintained until the isocyanate groups are essentially completely reacted. In order to reduce the presence of localized concentration gradients when conducting the chain extension in an aqueous medium, the polyamine is preferably added in increments to the dispersed prepolymer which is normally agitated to ensure complete mixing of the polyamine throughout the aqueous medium. The polyamine may be added to the aqueous medium in its pure form or it may be dissolved or dispersed in water or an organic solvent. Suitable organic solvents are those previously described for use in preparing the isocyanate-terminated prepolymer.

The final product is a stable, aqueous dispersion of polyurethane-urea particles having a solids content of up to about 60% by weight, preferably about 15-60% by weight and most preferably about 30-45% by weight. However, it is always possible to dilute the dispersions to any minimum solids content desired. The particle size is generally below about 1.0 micron, and preferably between about 0.001 to 0.5 micron. The average particle size should be less than about 0.5 micron, and preferably between 0.01 to 0.3 micron. The small particle size enhances the stability of the dispersed particles and also leads to the production of films with high surface gloss.

It has also been found that fewer anionic groups are required to produce stable aqueous dispersions of the polyurethane-ureas when using the most preferred anionic groups, i.e. mixtures of sodium sulfonates and trialkyl ammonium carboxylates. The reduced amount of anionic groups necessary for forming stable dispersions further improves the hydrolytic stability which may be obtained in accordance with the present invention.

Even when the polyurethane-urea dispersions of the subject application contain ionic groups they are largely unaffected by electrolytes if they also contain hydrophilic, ethylene oxide units. This provides, for example, for the acid-catalyzed cross-linking of the latex particles with formaldehyde or formaldehyde derivatives; similarly they may be pigmented with electrolyte-active pigments or dyes. Another property of the dispersions according to the present invention is that they may be coagulated which makes them suitable for processing into films permeable to water vapor simply by heating.

The dispersions may be blended with other dispersions, for example, with polyvinyl acetate, epoxy resins, polyethylene, polystyrene, polybutadiene, polyvinyl chloride, polyacryate and copolymer plastics dispersions. The addition of known, chemically nonfixed, ionic emulsifiers is also possible but not preferred. Fillers, plasticizers, pigments, carbon black, silica sols and the known levelling agents, wetting agents, antifoaming agents, stabilizers, etc. may also be incorporated into the dispersions.

The dispersions of the polyurethane-ureas in water are generally stable, storable and transportable, and may be processed at a later stage, for example, by foaming. In general, they dry directly into dimensionally stable coatings, although formation of the end products may also be carried out in the presence of known cross-linking agents. Polyurethane-ureas having different properties may be obtained according to the chemical composition selected and to the urethane group content. Thus, it is possible to obtain soft, tacky compositions, and thermoplastic and elastomeric products having a variety of different hardnesses up to glass-hard duroplasts. The hydrophilicity of the products may also vary within certain limits. The elastomeric products may be thermoplastically processed at elevated temperatures, for example, at from about 100° to 180° C., providing they are not highly cross-linked.

The end products of the process are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

The dispersions may also be applied to a porous substrate which subsequently remains bonded to the end product, such as woven or nonwoven textile structures and fiber mats, felts or nonwovens, also paper webs, foam sheeting or split leather which by virtue of their absorbing action cause the coating to harden immediately. This is followed by drying and, optionally, pressing at elevated temperatures. However, drying may also be carried out on smooth, porous or nonporous materials, for example, metal, glass, paper, cardboard, ceramic materials, sheet steel, silicone rubber, aluminum foil, the end sheet structure subsequently being lifted off and used as such, or applied to a substrate using the reversal process by bonding, flame lamination or calendering. Application by the reversal process may be carried out at any time.

The properties of the end products may be modified by using vinyl polymers or active and inactive fillers. It is possible to use, for example, polyethylene, polypropylene, polyvinyl acetate, ethylene/vinyl acetate copolymers which may optionally be (partially) hydrolyzed and/or grafted with vinyl chloride, styrenebutadiene copolymers, ethylene (graft) copolymers, polyacrylates, carbon black, silica, asbestos, talcum, kaolin, titanium dioxide and glass in the form of powder or in the form of fibers or cellulose. Depending upon the required property spectrum and the application envisaged for the final product, up to about 70%, based on total dry substance, of these fillers may be present in the final product. Dyes or additives which influence flow properties may, of course, also be added.

Drying of the product obtained by various application techniques may be carried out either at room temperature or at elevated temperature. The drying temperature to be selected in each individual case, which is governed not only by the chemical compositions of the material, but above all by its moisture content, the drying time and the layer thickness, is readily determined by a preliminary test. For a given heating time, the drying temperature must always be below the solidification temperature.

Extremely hard polyurethane-ureas obtained from finely divided dispersions and sols are suitable for use as stoving lacquers and, in some cases, even as air-drying lacquers. They combine extreme hardness and elasticity with high gloss, favorable light stability and weather resistance.

These polyurethane dispersions are specifically suited for coatings on vinyl fabrics used in automotive seating and commercial upholstery. In these application areas, properties like plasticizer barrier effect, improved abrasion resistance and good hydrolytic and UV-resistance are of importance. They are also useful as coatings for textiles such as tarpaulins, specifically for military application where properties like excellent toughness and retained properties after aging are essential.

Business machine housings which are made from plastic materials and where solvent borne coatings can attack the surface are another important application for these aqueous polyurethane-urea dispersions. Additionally, they are excellently suited to coat bowling alleys, as chip resistant coatings in automotive applications, for furniture, aircraft, foil and paper. They are also valuable as a co-binder for acrylic dispersions to improve properties like alcohol resistance, flexibility and appearance of resulting coatings.

The invention is further illustrated, but is not intended to be limited by the following examples in which all parts and percentages are by weight unless otherwise specified. The free isocyanate contents and the weights of the prepolymers are based on the solution of the prepolymer in solvent unless otherwise indicated.

EXAMPLES I-V 980.0 parts of a polyester diol (of adipic acid and 1,6-hexanediol having an OH-number of 134), 58.7 parts of α, α-dimethylolpropionic acid, 50.0 parts of a polyether monoalcohol of n-butanol, ethylene oxide and propylene oxide (in a molar ratio of ethylene oxide to propylene oxide 83:17) having an OH-number of 26 and 483.3 parts of N-methyl pyrrolidinone were combined and heated to 70° C. The mixture was stirred until homogeneous. To the mixture was added 550.7 parts bis-(4-isocyanatocyclohexyl)-methane. The mixture was stirred and heated to 105° C. for two hours. The free isocyanate content was determined to be 1.9%. To five separate aliquots of 400.0 parts of the prepolymer cooled to 70° C. were added the materials listed in Table I. The mixtures were heated to 70° C. and stirred at that temperature for 4 hours. 400.0 parts of the resulting anionic prepolymers were added to 350.0 parts of distilled water (38° C.) with vigorous stirring applied. Solutions of 4.9 parts diethylenetriamine and 32.1 parts distilled water were added to the dispersed prepolymers over a ten minute period. An additional 100.0 parts of distilled water were added to reduce the viscosity of the resulting dispersions. The dispersions were heated to 70° C. and maintained at that temperature with stirring for 2 hours. Table II lists the properties determined for these dispersions. Films were prepared on glass plates (10 mil wet film thickness) and dried 30 minutes at room temperature followed by 30 minutes at 80° C. Hydrolytic stability was determined by comparing the stress/strain properties of the films prepared from these dispersions both prior to and after 1 week storage at 70° C., 95% relative humidity. Resistance to water swell was determined by measuring the wei water pickup of 1"×1" squares (approx. 0.003" thickness) after submersing the squares in distilled water (room temperature) for a 24 hour period. The results of hydrolytic stability and water swell testing (average of triplicate determinations) are listed in Table III. Similar results for resistance to water swell may be obtained according to the water spot test.

TABLE I

| Example | Sodium Hydride (60% Part by Weight Mineral Oil) | Triethylamine | N—Methyl Pyrrolidinone |
|---|---|---|---|
| I | 0.00 | 8.17 | 57.8 |
| II | 0.81 | 6.12 | 57.8 |
| III | 1.61 | 4.09 | 57.8 |
| IV | 2.42 | 2.04 | 57.8 |
| V | 3.23 | 0.00 | 57.8 |

TABLE II

| Example | Equivalent % Sodium Carboxylate | Equivalent % Triethylammonium Carboxylate | pH | Solids Content (%) | Viscosity mPa.s @ 25° C. |
|---|---|---|---|---|---|
| I | 0 | 100 | 8.1 | 34.6 | 1000 |
| II | 25 | 75 | 8.9 | 32.9 | 1000 |
| III | 50 | 50 | 8.1 | 33.1 | 870 |
| IV | 75 | 25 | 8.6 | 31.3 | 550 |
| V | 100 | 0 | 8.2 | 32.9 | 2900 |

TABLE III

| | Before Hydrolytic Aging/After Hydrolytic Aging | | | | | |
|---|---|---|---|---|---|---|
| Example | 100% Modulus (psi) | 200% Modulus (psi) | 300% Modulus (psi) | Tensile Strength (psi) | Elongation (%) | (%) Water Pickup* |
| I | 800/300 | 1200/— | 1900/— | 2500/300 | 340/140 | 8.4 |
| II | 1200/700 | 2100/900 | 4400/1100 | 4600/1400 | 310/390 | 16.5 |
| III | 1000/700 | 1700/800 | 3000/1100 | 4500/1300 | 360/360 | 17.2 |
| IV | 1200/1000 | 2100/1700 | —/3000 | 4200/4500 | 290/380 | 8.8 |
| V | 1400/1200 | 2400/2100 | —/4300 | 4300/5100 | 290/320 | 15.9 |

*Values reported are percent water pickup relative to initial weight prior to submersing samples.

EXAMPLE VI 750.0 parts of a 70% solution in toluene of the propoxylated sodium salt of 1,4-dihydroxy-2-butane sulfonic acid having a molecular weight of 430 ("sulfonate diol") were mixed with 750.0 parts of additional toluene. Anhydrous hydrogen chloride was bubbled through the stirred mixture over a 1 hr. 45 min. period. The off gas was scrubbed through distilled water. The pH of the scrubber solution was 2 after the HCl addition period. The mixture separated into two phases, a clear solvent phase and a brown viscous liquid. The resulting brown liquid was separated from the solvent by decanting the toluene. The toluene was further reduced in volume by vacuum distillation (water aspirator). The brown liquid was dissolved in methyl ethyl ketone (50% parts by weight). A resulting white precipitate was removed by filtration. The bulk of the methyl ethyl ketone was then removed by distillation under reduced pressure (water aspirator). The resulting brown viscous liquid had an acid number of 120.

EXAMPLE VII 323.3 parts of a polyester diol (of adipic acid and 1,6-hexanediol having an OH-number of 134), 67.7 parts of the propoxylated 1,4-dihydroxy-2-butane sulfonic acid solution described in Example VI, 16.5 parts of a polyether monoalcohol of n-butanol, ethylene oxide and propylene oxide (in a molar ratio of 83:17) having an OH-number of 26, 159.5 parts of N-methyl pyrrolidinone and 13.8 parts of triethylamine were combined and heated to 50° C. The mixture was stirred until homogeneous and 181.7 parts of bis-(4-isocyanatocyclohexyl)-methane were added. The mixture was heated to 80°–85° C. for 2 hr. 15 min. The temperature was then raised to 95° C. for an additional 3 hr. 101.0 parts of N-methyl pyrrolidinone were added. The free isocyanate content was determined to be 1.5%.

EXAMPLE VIII 300.0 parts of the prepolymer described in Example VII were cooled to 35° C. and then added to 266.0 parts of vigorously stirred of distilled water. A solution of 3.4 parts diethylenetriamine and 40.0 parts distilled water was added over a 5 min. period. The dispersion was heated to 70° C. and stirring was maintained at this temperature for 2 hr. 30 min. The resulting dispersion was brown in color and solution-like in appearance. It had a pH of 4.5 and a viscosity of 530 mPa.s at 25° C.

EXAMPLE IX 588.0 parts of a polyester diol (of adipic acid and 1,6-hexanediol having an OH-number of 134), 167.3 parts of a 70% solution in toluene of the propoxylated sodium salt of 1,4-dihydroxy-2-butane sulfonic acid having a molecular weight of 430 ("sulfonate diol"), 30.0 parts of a polyether monoalcohol of n-butanol, ethylene oxide and propylene oxide (in a molar ratio of 83:17) having an OH-number of 26, 290.0 parts of N-methyl pyrrolidinone and 330.5 parts of bis(4-isocyanatocyclohexyl)-methane were combined and heated to 100°–110° C. and maintained between these temperatures with stirring for 2 hours. 184.0 parts N-methyl pyrrolidinone were added. The free isocyanate content was determined to be 1.3%.

EXAMPLE X 85.0 parts of the prepolymer described in Example VII and 170.0 parts of the prepolymer described in Example IX were combined and heated to 32° C. The mixture was added to 220.0 parts of vigorously stirred distilled water. A solution of 2.6 parts diethylenetriamine and 40.0 parts distilled water was added over a 3 min. period. 100.0 parts of distilled water was added to reduce viscosity. The dispersion was heated to 70° C. and stirred at that temperature for 45 min. It had a viscosity of 640 mPa.s at 25° C. and a pH of 6.7.

EXAMPLE XI 150.0 parts of the prepolymer described in Example VII and 150.0 parts of the prepolymer described in Example IX were combined and heated to 37° C. The mixture was added to 266.0 parts of vigorously stirred distilled water. A solution of 3.0 parts diethylenetriamine and 40.0 parts of distilled water was added over a 3 min. period. The dispersion was heated to 70° C. and stirred at that temperature for 1 hr., 30 min. It had a viscosity of 100 mPa.s at 25° C. and a pH of 5.7.

EXAMPLE XII 200.0 parts of the prepolymer described in Example VII and 100.0 parts of the prepolymer described in Example IX were combined and heated to 37° C. The mixture was added to 266.0 parts of vigorously stirred distilled water. A solution of 3.0 parts of diethylenetriamine and 40.0 parts of distilled water was added over a 3 min. period. The dispersion was heated to 70° C. and stirred at that temperature for 1 hr., 15 min. It had a viscosity of 70 mPa.s at 25° C. and a pH of 5.7.

Films were prepared (10 mil wet film thickness) from the dispersions described in Examples VIII, X, XI, and XII. They were dried 30 min. at room temperature followed by 30 min. at 80° C. The films were exposed to 70° C., 95% relative humidity for up to 2 weeks. Water swell data was determined for these dispersions as previously mentioned in Examples I–V, i.e. % water weight pickup after 24 hours submersion at room temperature. The results are listed in Table IV.

TABLE IV

| Example | Hydrolytic Stability[a] | | | | Water Swell[b] (%) |
|---|---|---|---|---|---|
| | 24 hr. | 72 hr. | 168 hr. | 2 weeks | |
| VIII | dissolved | dissolved | dissolved | dissolved | 105.9 |
| X | intact | intact | intact | intact | 23.2 |
| XI | very soft | dissolved | dissolved | dissolved | 58.9 |
| XII | very soft | dissolved | dissolved | dissolved | 55.9 |

[a]Film appearance after the indicated exposure period at 70° C., 95% relative humidity. No stress/strain properties were determined.
[b]Values reported are percent water pickup relative to initial weight prior to submersing samples.

EXAMPLE XIII 194.5 parts of a polyester diol (of adipic acid and 1,6-hexanediol having an OH-number of 134), 26.1 parts of neopentyl glycol, 20.4 parts of α,α-dimethylolpropionic acid, 8.2 parts of a polyether monoalcohol of n-butanol, ethylene oxide and propylene oxide (in a molar ratio 83:17) having an OH-number of 26 and 235.0 parts of N-methyl pyrrolidinone were combined and heated to 60° C. and stirred for 10 minutes. 250.5 parts of bis-(4-isocyanatocyclohexyl)-methane were added to the homogeneous mixture which was then heated to 110° C. for 3 hr. The free isocyanate content was determined to be 3.5%. The prepolymer was cooled to 65° C. and then 15.1 parts of triethylamine and 8.2 parts of Surfonic N-300 (Jefferson Chemical Co., 1540 MW ethoxylated nonyl phenol) were added. The prepolymer was added to 571.0 parts of vigorously stirred distilled water (35° C.) over an 8 min. period. After 3 min. additional stirring a solution of 9.1 parts ethylenediamine, 7.5 parts isophorone diamine, 5.0 parts diethylenetriamine and 123.0 parts distilled water was added to the dispersion over a 6 min. period. The dispersion was heated to 70° C. and stirred at that temperature for 2 hours. The resulting dispersion had a solids content of 35%, a viscosity of 325 mPa.s at 25° C. and a pH of 8.1.

EXAMPLE XIV 109.2 parts of a polyester diol (of adipic acid and 1,6-hexanediol having an OH-number of 134), 34 parts of a 70% solution in toluene of the propoxylated sodium salt of 1,4-dihydroxy-2-butane sulfonic acid having a molecular weight of 430 ("Sulfonate diol"), 23.4 parts of neopentyl glycol, 5.0 parts of a polyether monoalcohol of n-butanol, ethylene oxide and propylene oxide (in a molar ratio of 83:17) having an OH-number of 26 and 150.0 parts of N-methyl pyrrolidinone were combined and heated to 80° C. until homogeneous. 161.1 parts of bis-(4-isocyanatocyclohexyl)-methane were added and the mixture was heated to 105° C. After 2 hr. stirring at this temperature the free isocyanate content was determined to be 3.4%. 3.5 parts of Surfonic N-300 (Jefferson Chemical Co., 1540 MW ethoxylated nonyl phenol) were added. 460.0 parts of the prepolymer were added to 378.0 parts of vigorously stirred distilled water over a 5 min. period. A solution of 5.7 parts ethylene diamine, 4.7 parts isophorone diamine, 3.1 parts diethylenetriamine and 72.0 parts distilled water was added over a 4 min. period. The dispersion was heated to 70° C. and stirred at that temperature for 2 hrs. The resulting dispersion had a solids content of 37.8%, a viscosity of 100 mPa.s at 25° C. and a pH of 7.3.

EXAMPLE XV 50.0 parts of the dispersion described in Example XIII and 50.0 parts of the dispersion described in Example XIV were mixed at room temperature.

EXAMPLE XVI 109.2 parts of a polyester diol (of adipic acid and 1,6-hexanediol having an OH-number of 134), 17.0 parts of a 70% solution in toluene of the propoxylated sodium salt of 1,4-dihydroxy-2-butane sulfonic acid having a molecular weight of 430 ("Sulfonate diol"), 19.0 parts of neopentyl glycol, 5.7 parts of α, α-dimethylolpropionic acid, 4.8 parts of a polyether monoalcohol of n-butanol, ethylene oxide and propylene oxide (in a molar ration of 83:17) having an OH-number of 26 and 141.0 parts of N-methyl pyrrolidinone were combined and heated to 70° C. The mixture was stirred until homogeneous. To the mixture was added 150.8 parts of bis-(4-isocyanatocyclohexyl)-methane. The mixture was stirred and heated at 105° C. for 2 hours. The free isocyanate content was determined to be 3.6%. 4.2 parts of triethylamine and 4.8 parts of Surfonic N-300 (Jefferson Chemical Co., 1540 MW ethoxylated nonyl phenol) were added to the prepolymer cooled to 70° C. The mixture was stirred 10 minutes and then 400.0 parts of the prepolymer were added to 350.0 parts of vigorously stirred distilled water over a 5 minute period. A solution of 5.1 parts ethylenediamine, 4.3 parts isophorone diamine, 2.8 parts diethylenetriamine and 49.7 parts distilled water was added over a 5 minute period. The dispersion was heated to 70° C. and maintained at that temperature with stirring for 2 hours. The resulting dispersion had a solids content of 36.3%, a viscosity of 55 mPa.s at 25° C. and a pH of 7.9.

EXAMPLE XVII 10.0 parts of a 70% solution in toluene of the propoxylated sodium salt of 1,4-dihydroxy-2-butane sulfonic acid having a molecular weight of 430 ("Sulfonate diol"), 134.4 parts of a polyester diol (of adipic acid and 1,6-hexanediol having an OH-number of 134), 22.8 parts of neopentyl glycol, 5.6 parts of a polyether monoalcohol of n-butanol, ethylene oxide and propylene oxide (in a molar ratio of 83:17) having an OH-number of 26, 9.4 parts of α, α-dimethylolpropionic acid and 125.0 parts of N-methyl pyrrolidinone were combined and heated to 70° C. The mixture was stirred until homogeneous. To the mixture was added 183.5 parts of bis-(4-isocyanatocyclohexyl)-methane. The mixture was stirred and heated at 105° C. for 2 hours. The free isocyanate content was determined to be 4.0%. The mixture was cooled to 70° C. and then 6.7 parts of triethylamine, 40.0 parts N-methyl of pyrrolidinone and 3.8 parts of Surfonic N-300 (Jefferson Chemical Co., 1540 MW ethoxylated nonyl phenol) were added and the mixture was stirred for 15 minutes. 450.0 parts of the prepolymer were added to 418.2 parts vigorously stirred distilled water (35° C.) over a 5 minute period. A solution of 6.5 parts ethylenediamine, 11.2 parts isophorone diamine and 53.7 parts distilled water was added to the dispersed prepolymer over a 7 minute period. The dispersion was heated to 70° C. and maintained at that temperature with stirring for 2 hours. The resulting dispersion had a pH of 8.2, a viscosity of 135 mPa.s at 22° C. and a solids content of 37.7%.

EXAMPLE XVIII 7.0 parts of a 70% solution in toluene of the propoxylated sodium salt of 1,4-dihydroxy-2-butane sulfonic acid having a molecular weight of 430 ("Sulfonate diol"), 134.4 parts of a polyester diol (of adipic acid and 1,6-hexanediol having an OH-number of 134), 20.3 parts of neopentyl glycol, 5.6 parts of a polyether monoalcohol of n-butanol, ethylene oxide and propylene oxide (in a molar ratio of 83:17) having an OH-number of 26, 12.0 parts of α, α-dimethylolpropionic acid and 125.0 parts of N-methyl pyrrolidinone were combined and heated to 70° C. The mixture was stirred until homogeneous. To the mixture was added 179.9 parts of bis-(4-isocyanatocyclohexyl)-methane. The mixture was stirred and heated at 105° C. for 2 hours. The free isocyanate content was determined to be 3.9%. The mixture was cooled to 70° C. and then 8.6 parts triethylamine, 40.6 parts N-methyl pyrrolidinone and 3.8 parts Surfonic N-300 (Jefferson Chemical Co., 1540 MW ethoxylated nonyl phenol) were added and the mixture was stirred for 15 minutes. 450.0 parts of the prepolymer were added to 422.2 parts of vigorously stirred distilled water (35° C.) over a 5 minute period. A solution of 6.5 parts ethylenediamine, 10.9 parts isophorone diamine and 46.4 parts distilled water was added to the dispersed prepolymer over a 5 minute period. The dispersion was heated to 70° C. and maintained at that temperature with stirring for 2 hours. The resulting dispersion had a pH of 8.4, a viscosity of 900 mPa.s at 22° C. and a solids content of 37.7%.

EXAMPLE XIX 11.5 parts of a 70% solution in toluene of the propoxylated sodium salt of 1,4-dihydroxy-2-butane sulfonic acid having a molecular weight of 430 ("Sulfonate diol"), 134.4 parts of a polyester diol (of adipic acid and 1,6-hexanediol having an OH-number of 134), 20.8 parts of neopentyl glycol, 5.8 parts of a polyether monoalcohol of n-butanol, ethylene oxide and propylene oxide (in a molar ratio of 83:17) having an OH-number of 26, 10.4 parts of α, α-dimethylolpropionic acid and 125.0 parts of N-methyl pyrrolidinone were combined and heated to 70° C. The mixture was stirred until homogeneous. To the mixture was added 179.9 parts of bis-(4-isocyanatocyclohexyl)-methane. The mixture was stirred and heated at 105° C. for 2 hours. The free isocyanate content was determined to be 3.9%. The mixture was cooled to 70° C., then 7.4 parts of triethylamine, 40.0 parts of N-methyl pyrrolidinone and 3.8 parts of Surfonic N-300 (Jefferson Chemical Co., 1540 MW ethoxylated nonyl phenol) were added and the mixture stirred for 10 minutes. 450.0 parts of the prepolymer were added to 417.5 parts of vigorously stirred distilled water (35° C.) over a 10 minute period. A solution of 6.5 parts ethylenediamine, 10.9 parts isophorone diamine and 51.7 parts distilled water was added to the dispersed prepolymer over a 5 minute period. The dispersion was heated to 70° C. and maintained at that temperature with stirring for 2 hours. The resulting dispersion had a pH of 8.3, a viscosity of 6100 mPa.s at 22° C. and a solids content of 39.8%.

Films were prepared (10 mil wet film thickness) from the dispersions described in Examples XIII–XIX. They were dried 30 minutes at room temperature followed by 30 minutes at 80° C. The films were exposed to 70° C., 95% relative humidity for 1 week. The stress/strain properties of the films were determined both prior to and after the hydrolytic aging. Water swell data was determined for several of the dispersions as previously mentioned. The results are listed in Table V.

TABLE V

| Example | Before Hydrolytic Aging/After Hydrolytic Aging | | | | | Water Swell[a] (%) |
|---|---|---|---|---|---|---|
| | Initial (5%) Modulus (psi) | 100% Modulus (psi) | 200% Modulus (psi) | Tensile Strength (psi) | Elongation (%) | |
| XIII | 5100/b | 4000/b | — | 4000/b | 120/b | 5.4 |
| XIV | c | 4000/4750 | — | 5850/6150 | 180/170 | c |
| XV | 6400/5200 | — | — | 4700/4700 | 40/80 | 10.0 |
| XVI | 5800/4900 | 4500/— | — | 4600/4600 | 110/50 | 9.6 |
| XVII | c | 4350/4400 | 6600/— | 6800/4880 | 210/170 | c |
| XVIII | c | 3850/4250 | 6000/— | 6950/4350 | 240/110 | c |
| XIX | c | 3700/4150 | 5150/— | 6250/4750 | 240/130 | c |

[a] Values reported are percent water pickup relative to initial weight prior to 24 hour water submersion.
b Film intact but too brittle to test.
c Not determined.

EXAMPLE XX 115.4 parts of a polyester diol (of adipic acid and 1,6-hexanediol having an OH-number of 134), 23.9 parts of neopentyl glycol, 5.9 parts of α,α-dimethylolpropionic acid, 17.8 parts of a polyether monoalcohol of n-butanol, ethylene oxide and propylene oxide (in a molar ratio of 83:17) having an OH-number of 26 and 152.4 parts of N-methyl pyrrolidinone were combined and heated to 70° C. The mixture was stirred until homogeneous and then 163.6 parts of bis-(4-isocyanatocyclohexyl)-methane were added. The mixture was stirred and heated at 105° C. for two hours. The free isocyanate content was determined to be 3.6%.

EXAMPLE XXI 225.0 parts of the prepolymer described in Example XX cooled to 70° C., 0.81 parts of a 60% parts by weight suspension of sodium hydride in mineral oil and 2.05 parts of triethylamine were combined. The temperature was maintained at 70° C. with stirring for 2 hours. 2.5 parts of Surfonic N-300 (Jefferson Chemical Co., 1540 MW ethoxylated nonyl phenol) were added and the mixture was stirred for ten minutes. 215.0 parts of the prepolymer were added to 175.0 parts of vigorously stirred distilled water (38° C.) over a 5 minute period. A solution of 2.75 parts ethylenediamine, 2.30 parts isophorone diamine, 1.50 parts diethylenetriamine and 44.85 parts distilled water was added to the dispersed prepolymer over a 5 minute period. The dispersion was heated to 70° C. and maintained at that temperature with stirring for 2 hours. The resulting dispersion had a pH of 8.9, a viscosity of 165 mPa.s at 23° C. and a solids content of 38.8%.

EXAMPLE XXII 225.0 parts of the prepolymer described in Example XX cooled to 70° C. and 1.62 parts of a 60% parts suspension of sodium hydride in mineral oil were combined. The temperature was maintained at 70° C. with stirring for 2 hours. 2.5 parts of Surfonic N-300 (Jefferson Chemical Co., 1540 MW ethoxylated nonyl phenol) were added and the mixture stirred for ten minutes. 215.0 parts of the prepolymer were added to 175.0 parts of vigorously stirred distilled water (38° C.) over a five minute period. A solution of 2.75 parts ethylene diamine, 2.30 parts isophorone diamine, 1.50 parts diethylenetriamine and 44.85 parts distilled water was added to the dispersed prepolymer over a five minute period. The dispersion was heated to 70° C. and maintained at that temperature with stirring for 2 hours. The resulting dispersion had a pH of 10.1, a viscosity of 2100 mPa.s at 23° C. and a solids content of 39.3%.

Films were prepared (10 mil wet film thickness) from the dispersions described in Examples XXI and XXII. They were dried 30 minutes at room temperature followed by 30 minutes at 80° C. The films were exposed to 70° C., 95% relative humidity for 1 week. The stress/strain properties of the films were determined both prior to and after the hydrolytic aging. Water swell data was determined as previously mentioned. The results are listed in Table VI.

TABLE VI

| Example | Before Hydrolytic Aging/After Hydrolytic Aging | | | | Water Swell (%) |
|---|---|---|---|---|---|
| | Initial (5%) Modulus (psi) | 100% Modulus (psi) | Tensile Strength (psi) | Elongation (%) | |
| XXI | 5000/4700 | 3900/4400 | 4300/5800 | 110/160 | 12.2 |
| XXII | 4800/4500 | 4000/— | 4500/4300 | 120/90 | 13.0 |

EXAMPLE XXIII 116.0 parts of 1,6-hexamethylenediamine (60° C.) was charged into a 3 neck flask equipped with thermometer, mechanical stirrer, Dean-Stark trap and cold water condenser. 174.0 parts of isobutyraldehyde were added over a 10 minute period. The mixture exothermed to 80° C. and was maintained at that temperature for 15 minutes. The stirred material was then heated to 100°–110° C. for 6 hours. A total of 11.0 parts of water were removed in this time period. The material was heated to 160° C. for an additional 6 hours. Another 21.3 parts of water were removed in this time period. The material was maintained at 160° C. for an additional 4 hours. 12.2 parts of isobutyraldehyde were removed within this time period. The Dean-Stark trap and condenser were replaced by a distillation apparatus and the temperature was lowered to 95° C. A vacuum was applied (water aspirator) and the temperature was raised to 160° C. over a 1 hour, 30 min. period. Vacuum was maintained at 160° C. for an additional hour. An additional 11.2 parts of isobutyraldehyde were removed in this time period.

EXAMPLE XXIV 109.2 parts of a polyester diol (of adipic acid and 1,6-hexanediol having an OH-number of 134), 14.7 parts of neopentyl glycol, 11.5 parts of α, α-dimethylolpropionic acid, 4.6 parts of a polyether monoalcohol of n-butanol, ethylene oxide and propylene oxide (in a molar ratio of 83:17) having an OH-number of 26 and 131.9 parts of N-methyl pyrrolidinone were combined and heated to 70° C. The mixture was stirred until homogeneous. To the mixture was added 140.6 parts of bis-(4-isocyanatocyclohexyl)-methane. The mixture was stirred and heated at 105° C. for two hours. The free isocyanate content was determined to be 3.6%. To 200.0 parts of the prepolymer cooled to 70° C. was added 0.82 parts of a 60% parts by weight suspension of sodium hydride in mineral oil. Stirring was maintained at 70° C. for 40 minutes. 2.05 parts of triethylamine was added and the mixture was stirred at 70° C. for an additional hour. 2.2 parts of Surfonic N-300 (Jefferson Chemical Co., 1540 MW ethoxylated nonyl phenol) and 17.3 parts of the bis-aldimine from 1,6-hexamethylenediamine and isobutyraldehyde (as described in Example XXIII) were added and the mixture was stirred for 10 minutes. 200.0 parts of the mixture were added to 207.4 parts of vigorously stirred distilled water over a 5 minute period. A solution of 7.5 parts N-methyl pyrrolidinone and 42.5 parts distilled water was added to reduce viscosity and the dispersion was heated to 70° C. Stirring was maintained at this temperature for 2 hours. The resulting dispersion had a pH of 8.8, a viscosity of 1880 mPa.s at 21° C. and a solids content of 36.2%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable, aqueous dispersion of polyurethane-ureas wherein said polyurethane-ureas contain
   (i) about 10 to 120 milliequivalents per 100 grams of said polyurethane-ureas of chemically incorporated anionic groups, and
   (ii) up to about 10% by weight, based on the weight of said polyurethane-ureas, of lateral and/or terminal hydrophilic chains, containing ethylene oxide units, wherein the counterions of said anionic groups are a mixture of volatile and nonvolatile cations in an equivalent ratio of about 1:4 to 4:1.

2. The aqueous dispersion of claim 1 wherein said anionic groups are selected from the group consisting of carboxylate anions, sulfonate anions and mixtures thereof.

3. The aqueous dispersion of claim 1 wherein said volatile cations are tertiary amines.

4. The aqueous dispersion of claim 1 wherein said nonvolatile cations comprise an alkali metal.

5. The aqueous dispersion of claim 4 wherein said alkali metal is sodium.

6. The aqueous dispersion of claim 1 wherein said polyurethane-urea contain
   (i) about 10 to 60 milliequivalents per 100 grams of said polyurethane-ureas of chemically incorporated sulfonate and/or carboxylate groups, and
   (ii) 1 to 6by weight, based on the weight of said polyurethane-ureas, of lateral and/or terminal hydrophilic chains containing ethylene oxide units.

7. The aqueous dispersion of claim 3 wherein said nonvolatile cations are sodium.

8. The stable, aqueous dispersion of claim 1 wherein said polyurethane-ureas are prepared by a process which comprises initially forming an isocyanate-terminated prepolymer containing aliphatically- and/or cycloaliphatically-bound. terminal isocyanate groups and subsequently forming said polyurethane-ureas by chain extending said prepolymer with a polyfunctional amine having an average functionality between about 2 and 6.

9. The aqueous dispersion of claim 8 wherein the isocyanate component used in preparing said prepolymer is bis-(4-isocyanatocyclohexyl)-methane.

10. The aqueous dispersion of claim 2 wherein said anionic groups are a mixture of sulfonate groups and carboxylate groups and wherein said cations are a mixture of sodium ions and trialkyl ammonium ions.

11. A stable, aqueous dispersion of polyurethane-ureas wherein
    (a) said polyurethane-ureas contain
        (i) about 10 to 60 milliequivalents per 100 grams of said polyurethane-ureas of chemically incorporated sulfonate and/or carboxylate anionic groups, and
        (ii) about 1 to 6% by weight, based on the weight of said polyurethane-ureas, of lateral and/or terminal hydrophilic chains containing ethylene oxide units;
    (b) said polyurethane-ureas are prepared by a process which comprises initially forming an isocyanate-terminated prepolymer containing aliphatically- and/or cycloaliphatically-bound, terminal isocyanate groups and subsequently forming said polyurethane-ureas by chain extending said prepolymer with a polyfunctional amine having an average functionality between about 2 and 3; and
    (c) the counterions of said anionic groups are a mixture of volatile tertiary amines and alkali metals in an equivalent ratio of about 1:4 to 4:1.

12. The aqueous dispersion of claim 11 wherein said alkali metal is sodium.

13. The aqueous dispersion of claim 11 wherein the isocyanate component used in preparing said prepolymer is bis-(4-isocyanatocyclohexyl)-methane.

14. The aqueous dispersion of claim 11 wherein said anionic groups are a mixture of sulfonate groups and carboxylate groups and wherein said counterions are a mixture of sodium ions and trialkyl ammonium ions.

15. The aqueous dispersion of claim 11 wherein said isocyanate-terminated prepolymer is dispersed in an aqueous medium prior to the addition of said polyfunctional amine.

16. A coated substrate prepared from the aqueous dispersion of claim 1.

17. A film prepared from the aqueous dispersion of claim 1.

* * * * *